(12) United States Patent
Chu (10) Patent No.: US 8,405,366 B2
(45) Date of Patent: Mar. 26, 2013

(54) METHOD FOR CONTROLLING GENERATION OF ELECTRICAL POWER

(75) Inventor: Ming-Tsung Chu, Taichung Hsien (TW)

(73) Assignee: Adlee Powertronic Co., Ltd., Taichung Hsien (TW)

( * ) Notice: Subject to any disclaimer, the term of this patent is extended or adjusted under 35 U.S.C. 154(b) by 357 days.

(21) Appl. No.: 12/907,034

(22) Filed: Oct. 19, 2010

(65) Prior Publication Data

US 2012/0091974 A1 Apr. 19, 2012

(51) Int. Cl.
*H02P 9/00* (2006.01)
*H02P 6/18* (2006.01)

(52) U.S. Cl. .................... 322/94; 318/400.34

(58) Field of Classification Search ............ 322/94; 318/400.1–400.42
See application file for complete search history.

(56) References Cited

U.S. PATENT DOCUMENTS

| | | | | |
|---|---|---|---|---|
| 3,679,953 A * | 7/1972 | Bedford | ............ | 318/254.1 |
| 3,748,554 A * | 7/1973 | McDonald | ............ | 318/400.31 |
| 3,749,991 A * | 7/1973 | Kuniyoshi | ............ | 318/400.02 |
| 4,024,443 A * | 5/1977 | Schmucker et al. | ............ | 318/721 |
| 4,450,396 A * | 5/1984 | Thornton | ............ | 318/721 |
| 4,454,454 A * | 6/1984 | Valentine | ............ | 318/293 |
| 5,196,775 A * | 3/1993 | Harris et al. | ............ | 318/638 |
| 5,227,704 A * | 7/1993 | Erdman | ............ | 318/400.34 |
| 5,473,227 A * | 12/1995 | Arnaud et al. | ............ | 318/139 |
| 5,485,064 A * | 1/1996 | Arnaud et al. | ............ | 318/139 |
| 5,640,071 A * | 6/1997 | Malaspina et al. | ............ | 318/139 |
| 5,936,386 A * | 8/1999 | Heglund | ............ | 322/94 |
| 6,388,405 B2 * | 5/2002 | Laurent | ............ | 318/400.09 |
| 6,661,206 B2 * | 12/2003 | Gallegos-Lopez | ............ | 322/23 |
| 6,870,337 B2 * | 3/2005 | Peterson | ............ | 318/459 |
| 7,006,761 B2 * | 2/2006 | Herke | ............ | 318/400.01 |
| 7,095,194 B2 * | 8/2006 | Kro et al. | ............ | 318/400.38 |
| 7,554,279 B2 * | 6/2009 | Loffler et al. | ............ | 318/400.07 |
| 7,795,830 B2 * | 9/2010 | Johnson | ............ | 318/432 |
| 7,821,221 B2 * | 10/2010 | Kragh et al. | ............ | 318/774 |
| 7,880,427 B2 * | 2/2011 | Foll et al. | ............ | 318/811 |
| 8,106,611 B2 * | 1/2012 | Chen et al. | ............ | 318/400.06 |
| 2003/0006724 A1 * | 1/2003 | Getz et al. | ............ | 318/254 |
| 2005/0258789 A1 * | 11/2005 | Getz et al. | ............ | 318/254 |
| 2006/0006822 A1 * | 1/2006 | Kro et al. | ............ | 318/254 |
| 2008/0143284 A1 * | 6/2008 | Kragh et al. | ............ | 318/400.17 |
| 2008/0272664 A1 * | 11/2008 | Flynn | ............ | 310/154.01 |
| 2008/0315807 A1 * | 12/2008 | Loffler et al. | ............ | 318/400.07 |
| 2009/0121664 A1 * | 5/2009 | Sugimoto et al. | ............ | 318/400.09 |

* cited by examiner

*Primary Examiner* — Pedro J Cuevas
(74) *Attorney, Agent, or Firm* — Leong C. Lei (57) ABSTRACT

A method is provided for controlling power generation. A control circuit is employed to control first and second switches of each of multiple switch groups of a drive circuit so that the first switches are kept in OFF state while the second switches are each switched between ON and OFF states at each given time point. With the second switches of the switch groups alternately switched ON/OFF, electrical power is fed to a circuit system, which includes a power storage device or an application device of loading.

8 Claims, 10 Drawing Sheets

METHOD FOR CONTROLLING GENERATION OF ELECTRICAL POWER

TECHNICAL FIELD OF THE INVENTION

The present invention generally relates to a method for controlling power generation of a brushless permanent magnet kinetic mechanism, wherein switches that are electrically connected to the brushless permanent magnet kinetic mechanism are controlled to alternately switch ON and OFF, so as to convert and feed rotational kinetic energy of a rotor of the brushless permanent magnet kinetic mechanism to a circuit system, which comprises, but is not limited to, a power storage device or an application device of loading. With the technology of the present invention, the rotor with a brushless permanent magnet can effect conversion between kinetic energy and electrical energy even at a low rotational speed.

DESCRIPTION OF THE PRIOR ART

Figure 9:
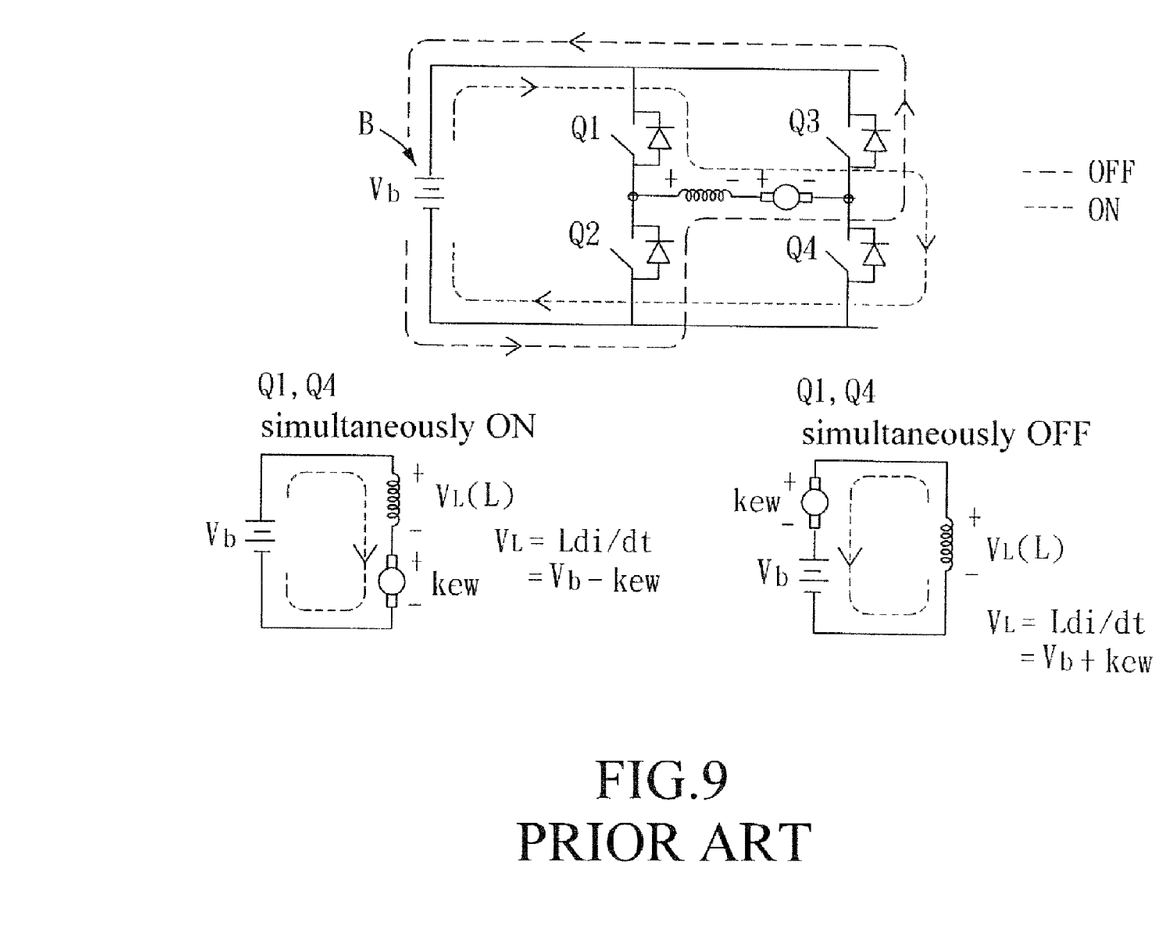
FIG. 9 shows an equivalent circuit illustrating ON/OFF switching of drive circuits of two phases of a conventional brushless permanent magnet kinetic mechanism in a power generation mode.

FIG. 9 of the attached drawings shows an equivalent circuit illustrating ON/OFF switching of drive circuits of driving devices of two phases of a brushless permanent magnet electric motor in a power generation mode. In the power generation mode, the driving devices have switches on the upper side and the lower side and one upper side switch and one lower side switch are simultaneously set ON. In other words, either switches Q1 and Q4 are simultaneously ON or switches Q2 and Q3 are simultaneously set ON, in order to proceed with charging to a coil inductor L. The induced voltage $V_L$ of the inductor is $L(di/dt)=V_b-kew$. When the two switches Q1 and Q4, or Q2 and Q3, are simultaneously set OFF, charging is performed to a power storage device B, where the induced voltage $V_L$ of the coil inductor L is $L(di/dt)=V_b+kew$.

As can be seen from the equations of charging, the back electromotive force (back EMF) kew and the voltage Vb of the power storage device B (such as a rechargeable battery) are in series connection so that the voltage $V_L$ of the inductor L must be increased in order to effectively charge the power storage device B. This leads to poor result of power generation.

Figure 10:
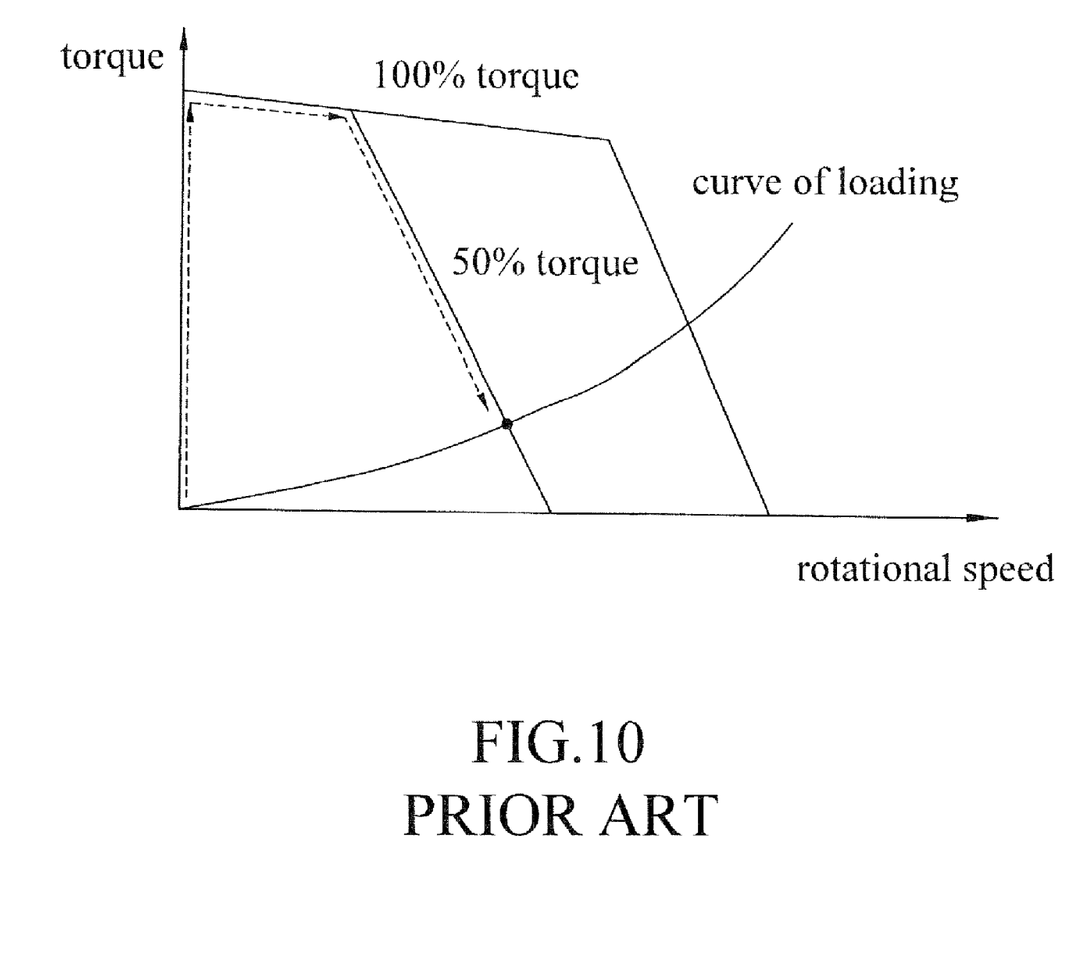
FIG. 10 is a plot of torque vs. rotational speed according to voltage duty control of a conventional electric motorcycle.

Further, a method for switching power generation employed in a conventional electric motorcycle is voltage duty control (namely controlled by voltage). FIG. 10 shows a plot of electric torque vs. rotational speed of a conventional electric motorcycle under voltage duty control. Since the torque behavior of the electric motorcycle is controlled by voltage, taking 50% voltage duty as an example, to immediately increase accelerator from standstill to 50% voltage duty, the torque behavior is shown with phantom lines, in which the starting torque is great, but the torque lowers instantaneously, leading to abrupt forward movement and then quickly slowing down in driving the electric motorcycle. This gives an unsmooth condition of riding and may even result in dangers.

On the other hand, in the power generation mode, when it is immediately increased from no power generated to 50% duty of power generation, the initial torque will be abruptly increased to the maximum and the immediately lowered down from the maximum level to 50% duty This causes an abrupt stop similar to emergency braking (namely engine braking) and may easily lead to unsmooth and dangerous riding.

SUMMARY OF THE INVENTION

In view of these problems, a primary objective of the present invention is to provide a method for controlling power generation, which is applicable to an electric motor or an electric generator, wherein with an existing control circuit and drive circuit of the electric motor or electric generator, a different approach of switching is employed to convert rotation kinetic energy of the electric motor or the electric generator into electric energy with the highest efficiency of conversion.

Another objective of the present invention is to realize maximum generation of power through phase sequencing, wherein an optimum approach of switching of switches is employed to allow rotational kinetic energy of an electric motor or an electric generator to be converted into electrical energy with maximum energy conversion.

A further objective of the present invention is to provide an arrangement of processing signals from current detection elements with a microprocessor, such as a microcontroller unit or a central processing unit, wherein current signals from the current detection elements are processed by shifting values of the signals so that the microprocessor can directly handle the current signals without being damaged.

Yet a further objective of the present invention is to provide a method that is applied to an electric motor having both motor mode and power generation mode, wherein the torque of the electric motor is controlled by electric current.

To achieve the above objectives, the present invention provides a method for controlling power generation applicable to both electric motor and electric generator, wherein a control circuit is employed to control a drive circuit. The drive circuit comprises at least two groups of switch, which are connected in parallel to each other. Each group comprises a first switch and a second switch, which are connected in series with each other. A kinetic mechanism that comprises rotor, stator, and magnetic field has phases each of which is connected between the first and second switches of each group. At least one rotor position detection element is arranged to detect position signals of the rotor. The switch groups are each electrically connected to a circuit system, which comprises, but is not limited to, a power storage device and an application device for loading. The method for controlling power generation comprises each of the second switches being subjected to pulse width modulation for ON/OFF switching according to the position signals of the rotor and each of the first switches remaining OFF.

The method for controlling power generation according to the present invention allows the rotor of a kinetic mechanism to effectively convert kinetic energy of the rotor into electric energy even at a low rotational speed. The rotation and rotational speed of the rotor are driven by a force input device, which includes, but is not limited to, a rotary device rotated by wind power or hydraulic power.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
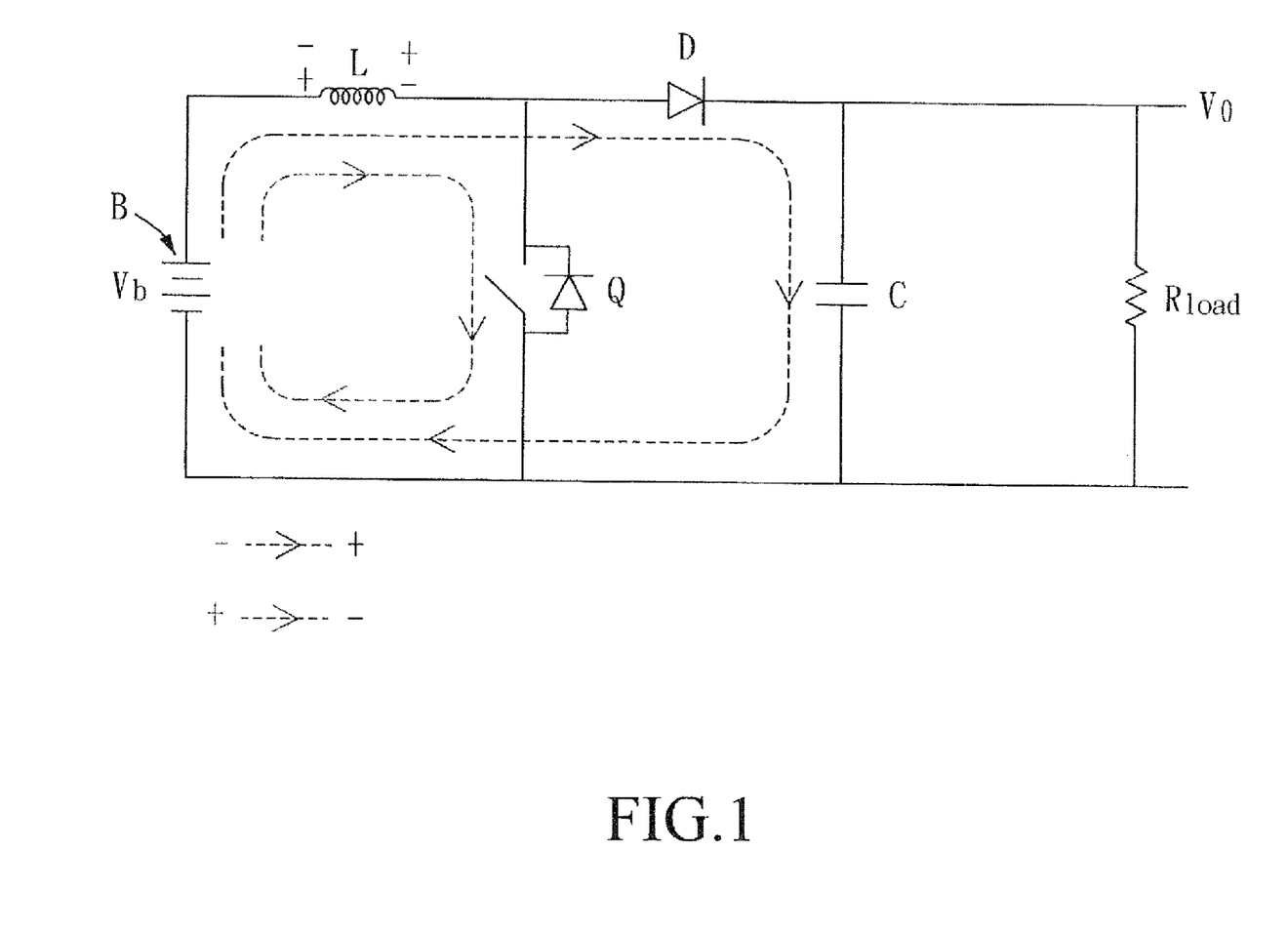
FIG. 1 shows a schematic view of a circuit illustrating an operation principle employed in the present invention.

Referring to FIG. 1, a schematic view of a circuit illustrating an operation principle employed in the present invention is shown. The circuit schematically illustrated in the drawing is a boost converter for direct-current (DC) to DC conversion, comprising an electrical power storage device B, an electrical inductor L, a switch Q, a diode D, a capacitor C, a load $R_{load}$, and a voltage output $V_o$.

With this circuit, the operation of the inductor L is used to temporarily store energy that is converted between electrical energy and magnetic energy, whereby when the switch Q conducts on, the power storage device B applies a voltage $V_b$ to charge the inductor L and the inductor L converts the electrical energy into magnetic energy for storage.

Under this condition, the terminal voltage of the inductor L is $V_L$=Ldi/dt.

When the switch Q conducts off, the voltage of the inductor L is reversed and is in serial connection with an input voltage $V_b$ from the power storage device B, whereby the diode D conducts on to allow for charging to the capacitor C, so that the capacitor C can be charged to a voltage level $V_o$ that is higher than the input voltage $V_b$. Since the output voltage $V_o$ is a combination of the input voltage $V_b$ and an electrical energy that is converted from the magnetic energy of the inductor L, the output voltage $V_o$ is higher than the input voltage $V_b$, and this completes the boosting operation $V_o=V_b+V_L$.

In the circuit diagram shown in FIG. 1, the switch Q comprises a power transistor, of which conducting on/off is controlled by a pulse width modulation (PWM) circuit. The output voltage $V_o$ is determined through ON/OFF ratio of the pulse width modulation.

Figure 2:
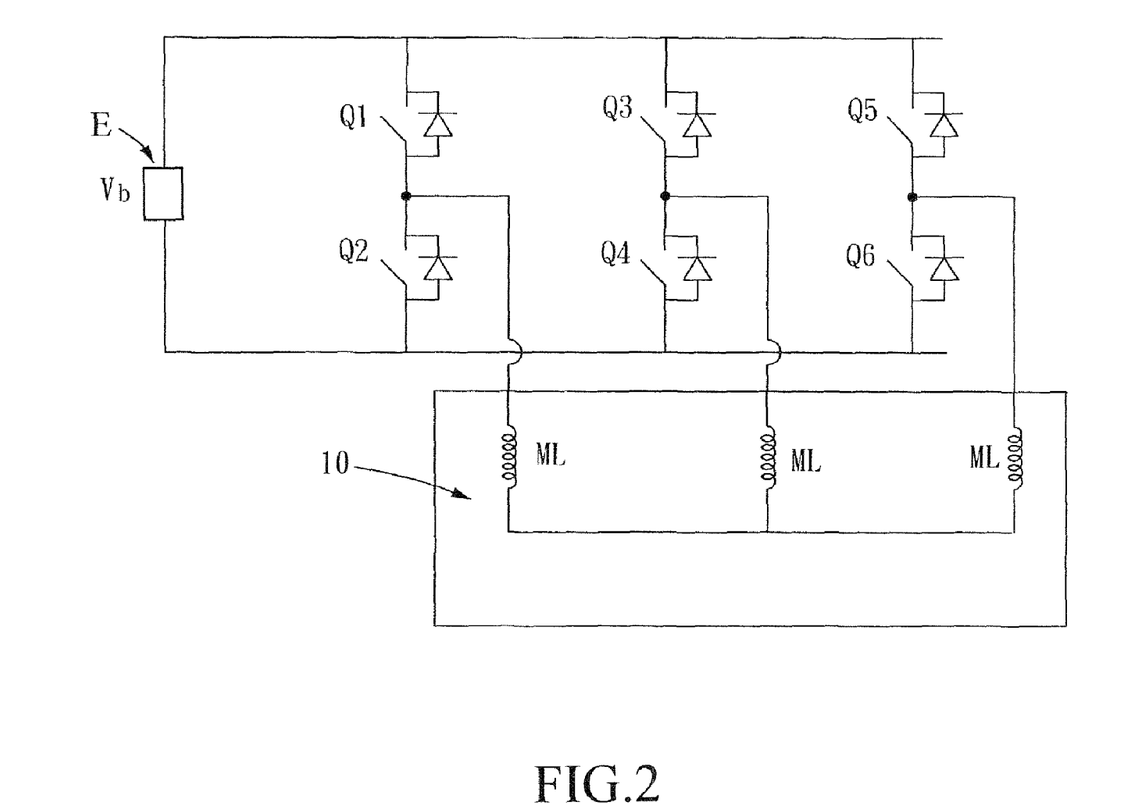
FIG. 2 shows connection of a drive circuit according to the present invention and a brushless permanent magnet kinetic mechanism.
Figure 3:
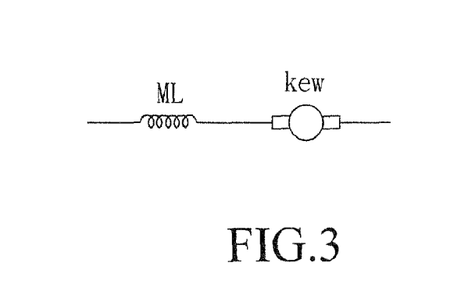
FIG. 3 shows an equivalent circuit of the brushless permanent magnet kinetic mechanism according to the present invention.

Referring to FIG. 2, connection of a drive circuit according to the present invention to a kinetic mechanism 10 (such as an electric motor or an electric generator) that comprises a rotor, a stator, and a magnetic field is schematically shown. When rotational speed of the rotor of the kinetic mechanism 10 is not 0, a back electromotive force (back EMF) kew is induced. Since the kinetic mechanism 10 comprises a coil that is a winding of conductive wires, the coil is also an electrical inductor ML. An equivalent circuit is shown in FIG. 3.

Figure 4:
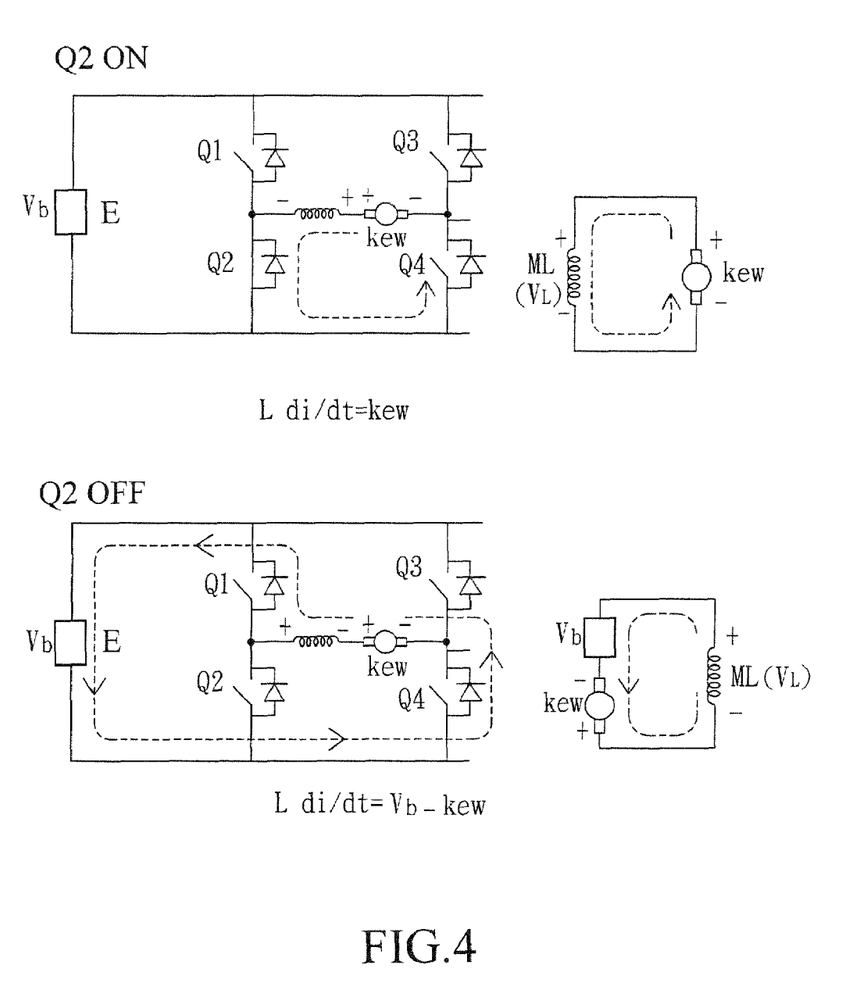
FIG. 4 shows an equivalent circuit illustrating ON/OFF switching of the drive circuits of two phases of the brushless permanent magnet kinetic mechanism according to the present invention in power generation.

Referring to FIG. 4, an equivalent circuit illustrating ON/OFF switching of the drive circuits of two phases of the kinetic mechanism 10 in power generation condition is shown. When a switch Q2 conducts on, the two phases of the kinetic mechanism 10 forms a shoring circuit. Since the rotation of the rotor of the kinetic mechanism 10 cuts through the magnetic field, a back EMF kew is induced, which continuously charges the coil inductor ML to store energy in the inductor ML. The back EMF kew is equal to the voltage of the inductor ML, which is $V_L$=Ldi/dt.

When the switch Q2 is open and thus off, the voltage of the inductor ML is reversed, causing an electrical current flowing through diodes D and the circuit system E to complete a circuit. Since the summed voltage of the voltage $V_b$ of the circuit system E and the back EMF kew connected in series is smaller than the voltage $V_L$ of the inductor ML, so that electrical power is allowed to supply to the circuit system E. When the circuit system E is a power storage device, it is charged; when the circuit system E is a loaded, it is powered and operated.

The inductor ML supplies a voltage $V_L$=Ldi/dt, which is equal to $V_b$ minus the back EMF kew. Consequently, the kinetic mechanism 10 can generate electrical power even at a low rotational speed.

Figure 5:
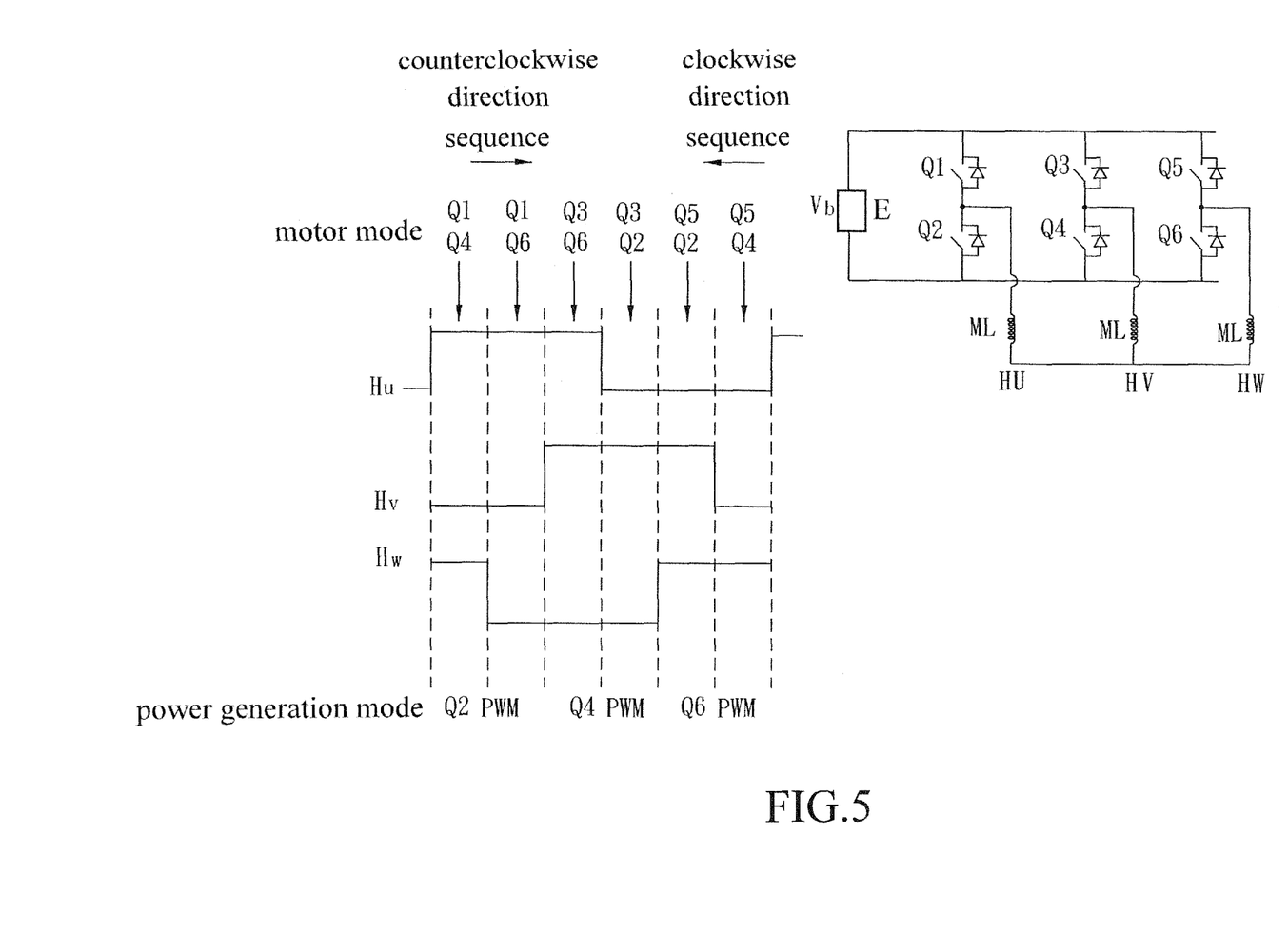
FIG. 5 is illustration of switching of switches for motor drive mode and power generation mode of a three-phase brushless permanent magnet kinetic mechanism according to the present invention.

Referring to FIG. 5, illustration of switching of switches for motor driving mode and power generation mode of a three-phase brushless permanent magnet kinetic mechanism 10 according to the present invention is given. The illustration shows the way to make the brushless permanent magnet kinetic mechanism 10 operating to generate electrical power at the maximum level of power generation. In the instant embodiment, a three-phase permanent magnet kinetic mechanism 10 together with rotor position detection elements formed of Hall elements is taken as an example for illustration. For a kinetic mechanism 10 having different phases, different numbers of Hall elements are used.

Figure 6:
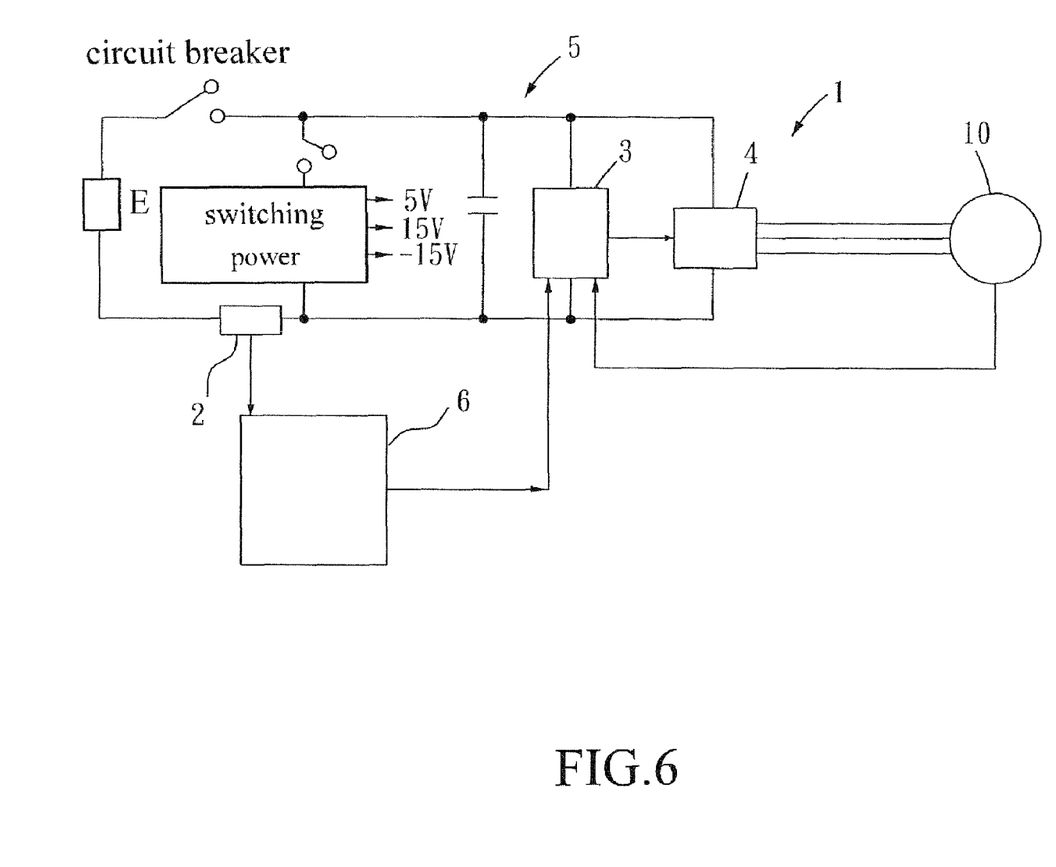
FIG. 6 shows a schematic view of circuit of an electrical torque control system according to the present invention.

The brushless permanent magnet kinetic mechanism 10 is provided with three rotor position detection elements, which are respectively formed of Hall elements HU, HV, HW, for detecting the positions of the rotor, in order to detect position signals Hu, Hv, Hw, and a control circuit 3 (as shown in FIG. 6), which performs predetermined ON/OFF switching operations for pulse width modulation (PWM) of switches Q1 to Q6, in order to achieve the optimum operation condition. When the brushless permanent magnet kinetic mechanism 10 is set in the power generation mode, the switches Q2, Q4, Q6 are respectively subjected to PWM ON/OFF switching according to the positional signals Hu, Hv, Hw, while the switches Q1, Q3, Q5 remain OFF and are subjected to no switching. Alternatively, the switches Q2, Q4, Q6 can be kept OFF without being subjected to any switching, and the switches Q1, Q3, Q5 are subjected to PWM ON/OFF switching according to the position signals Hu, Hv, Hw, and the same result can be achieved. Those switches Q that are kept OFF will be referred to as "first switches", while those switches Q that are subjected to PWM ON/OFF switching according to the position signals are referred to as second switches.

For example, when the position signals Hu, Hv, Hw of the Hall elements HU, HV, HW are respectively binary 1, 0, 0, in the motor mode, the switches Q1, Q6 are ON to allow the kinetic mechanism 10 to operate normally. In the power generation mode, the switch Q2 is set ON to allow the rotor to cut through the magnetic field in order to charge the coil inductor ML of the kinetic mechanism 10. Based on the same demonstration shown in FIG. 4, when the switch Q2 conducts on, two phases of the brushless permanent magnet kinetic mechanism 10 form a shoring circuit and since the rotor of the brushless permanent magnet kinetic mechanism 10 is rotated to cut through the magnetic field and thus induces a back EMF kew, the back EMF kew continuously charges the coil inductor ML to store energy in the inductor ML, where the back EMF kew is equal to the voltage $V_L$=Ldi/dt of the inductor ML. When the switch Q2 is off, the voltage of the inductor ML is reversed and an electrical current flows through the diodes to form a circuit with the circuit system E. Since the summed voltage of the voltage $V_b$ of the circuit system E and the back EMF kew connected in series is smaller than the voltage $V_L$ of the inductor ML, electrical power can be supplied to the circuit system E. When the circuit system E is a power storage device, it is charged; when the circuit system E is a loaded, it is powered and operated. Since the inductor ML supplies a voltage $V_L$=Ldi/dt, which is equal to $V_b$ minus the back EMF kew, the kinetic mechanism 10 can generate electrical power even at a low rotational speed.

To achieve the maximum level of power generation, the timing of switching of power transistors is vital. When the rotor of the kinetic mechanism 10 is rotated to cut through the magnetic field and generates a back EMF, the back EMF induces voltage of various levels in the stator coil of each phase. It is thus desired to make an arrangement for generating electrical power at a high level of voltage in order to ensure improved amount of energy generated and efficiency of power generation. Based on the position signals detected by the rotor position detection elements, the relative positions between the rotor and the stator coils can be identified, with which the back EMF can be determined. Taking a three-phase brushless permanent magnet kinetic mechanism 10 provided with Hall elements as rotor position detection elements as an example, when the signal Hu becomes high, the back EMF of the U-phase coil is of a high level and consequently, the switch Q2 of the drive circuit should be set ON to charge the coil; when the signal Hv becomes high, then the switch Q4 is set ON; and when the signal Hw becomes high, then the switch Q6 is set ON. The switching among U, V, W phases is set to 120 degrees between any two successive ones. Other multi-phase brushless permanent magnet kinetic mechanism 10 can be operated under the same idea with the switching angle being 360 degrees divided by the total number of phase. Similarly, the present invention is also applicable by alternately conducting the switches Q1, Q3, Q5 on according to the position signals Hu, Hv, Hw becoming high to achieve the same result of power generation. The difference between the two arrangements is that the position signal for the high level of the voltage wave of the back EMF is the high voltage zone of the upper half for one arrangement and the high voltage zone of the lower half for the other arrangement.

The switches Q can be set ON/OFF according to the position signals of the high voltage zones. Taking the upper half wave as an example, it is set on at the 30° position of the upper half wave and set off at the 150° position and the ON/OFF switching is sequentially performed for successive upper half wave. For other multi-phase brushless permanent magnet kinetic mechanism 10, then switching ON is at the position of [180°-(360°/phase number)]/2 (such as 45° for four phase arrangement and 60° for six phase arrangement), and switching OFF is at the position of 180°-{[180°-(360°/phas number)]/2} (such as 135° for four phase arrangement and 120° for six phase arrangement). The ON/OFF switching operations for the positional signals of the lower half wave are performed with the same principle in order to achieve the maximum result of power generation. Since the lower half wave is different from the upper half wave by 180°, the angular positions of switching ON/OFF can be added by 180° to those of the upper half wave.

Referring to FIG. 6, a schematic view of circuit of an electrical torque control system according to the present invention is shown. The electrical torque control system 1 according to the present invention comprises a power circuit 5 comprising at least a control circuit 3, a current detection element 2, and a drive circuit 4 and the kinetic mechanism 10 described above.

The control circuit 3 comprises a central processing unit (CPU) or a microcontroller unit (MCU). The following description of the present invention in made on the basis of central processing unit. The control circuit 3 is in electrical connection with the drive circuit 4, the power circuit 5, and the kinetic mechanism 10. To control the voltage and current supplied to the circuit system E (see FIG. 4), the current detection element 2 is employed to cooperate with a current signal shifting circuit 6, for the brushless permanent magnet kinetic mechanism 10 generates electrical current in opposite directions in the same drive circuit 4 and the electrical current signal in one direction is negative. The CPU or MCU of the control circuit 3 does not take a negative current signal, for a negative current signal may lead to malfunctioning. According to the present invention, a current signal shifting circuit 6 is employed to shift the current signal by predetermined offset so as to make the current signal always positive and allowing the current signal in the opposite direction provided by power generation to be acceptable to the CPU or MCU.

Figure 7A:
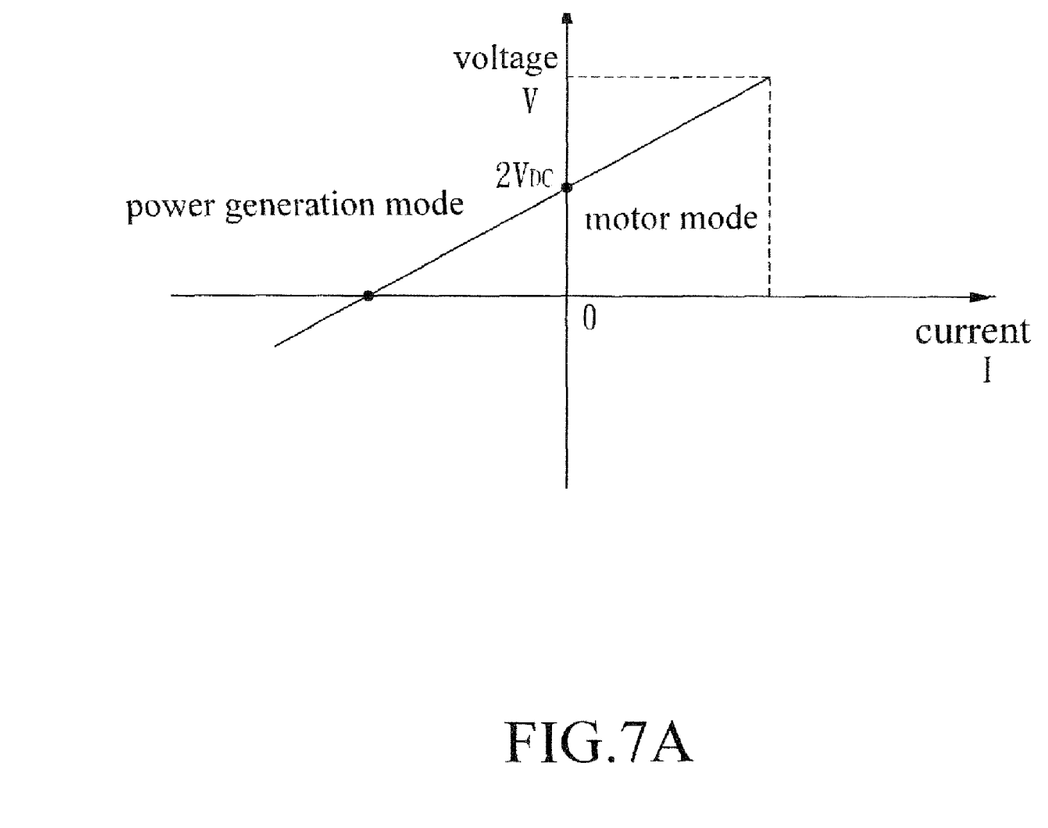
FIG. 7A shows a plot of current-voltage curve of a current signal shifting circuit according to the present invention.

Referring to FIG. 7A, a plot of current-voltage curve of the current signal shifting circuit according to the present invention is shown. When the current is zero, the current signal (a corresponding voltage level) is not zero and assuming the voltage under this condition is $2V_{DC}$. In other words, when the control circuit 3 (CPU) detects a current signal lower than $2V_{DC}$, the control circuit 3 identifies that it is currently in the power generation condition and the current signal does not cause any problem to the control circuit 3 (CPU).

Figure 7B:
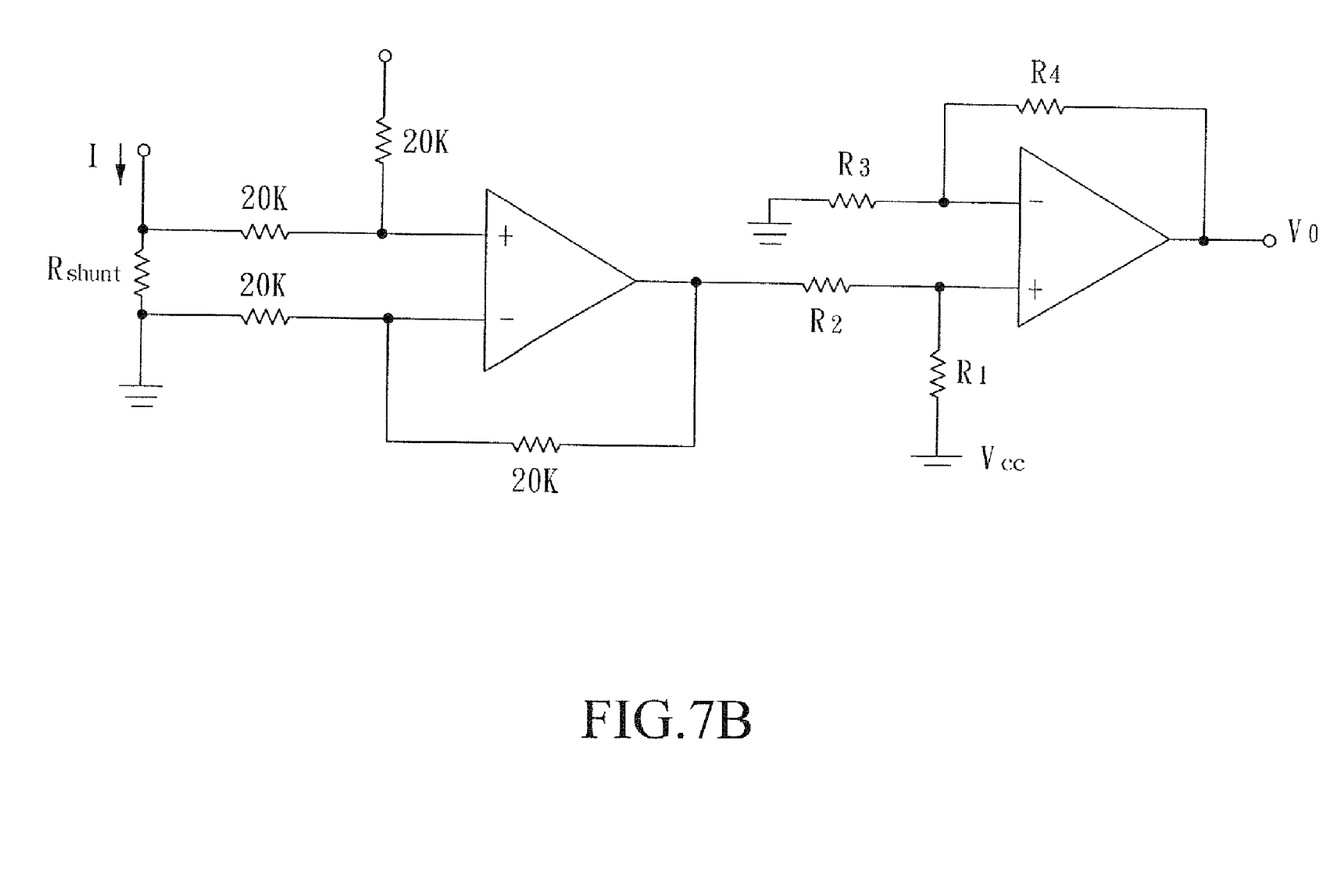
FIG. 7B shows an example circuit diagram of the current signal shifting circuit according to the present invention.

Referring to FIG. 7B, an example circuit diagram of the current signal shifting circuit according to an embodiment of the present invention is shown. The drive circuit 4 is set in electrical connection with a current signal shifting circuit 6, and the relationship between output voltage $V_O$ and input current I is expressed as follows:

$$V_O = \left(V_{CC} \times \frac{R_2}{R_1 + R_2} + I \cdot R_{Shunt} \times \frac{R_1}{R_1 + R_2}\right)\left(1 + \frac{R_4}{R_3}\right)$$

wherein $V_O$ stands for the voltage fed to the control circuit 3 (CPU), $V_{CC}$ is a reference voltage, $R_{shunt}$ is an electrical resistor located on the power side for detecting electrical current, and I stands for input current.

Thus, with the current signal shifting circuit 6, a negative current generated by the drive circuit 4 can be processed for signal shifting.

Further, the drive circuit 4 is electrically connected to the control circuit 3 and the kinetic mechanism 10 and is controlled by the control circuit 3. As described above, the drive circuit 4 comprises switches Q1 to Q6, which are grouped as a first switch group including switches Q1, Q2 connected in series, a second switch group including switches Q3, Q4 connected in series, and a third switch group including switches Q5, Q6 connected in series, the first, second, and third switch groups being arranged in parallel to each other and electrically connect to the circuit system E. Further, the kinetic mechanism 10 has three phases that are respectively connected between the switches Q1, Q2, between the switches Q3, Q4, and between the switches Q5, Q6.

As shown in FIG. 5, under the power generation mode, the switches Q1, Q3, Q5 are OFF, while the switches Q2, Q4, Q6 are alternately subjected to pulse width modulation and set ON. The operation is carried out according to the position signals Hu, Hv, Hw of the Hall elements HU, HV HW (rotor position detection elements) of the kinetic mechanism 10 and ON/OFF switching control is performed to control the time period of ON state from a short period to a long period to achieve the purpose of increasing the electrical torque from a small value to a large value (this being equivalent to increasing the level of electrical current generated from low to high). In other words, when the electrical power generated exceeds the loading of the circuit system E, the electrical torque can be lowered from a large value to a small value.

Thus, the electrical torque is variable in order to realize control over the voltage and current applied to the circuit system E.

Figure 8:
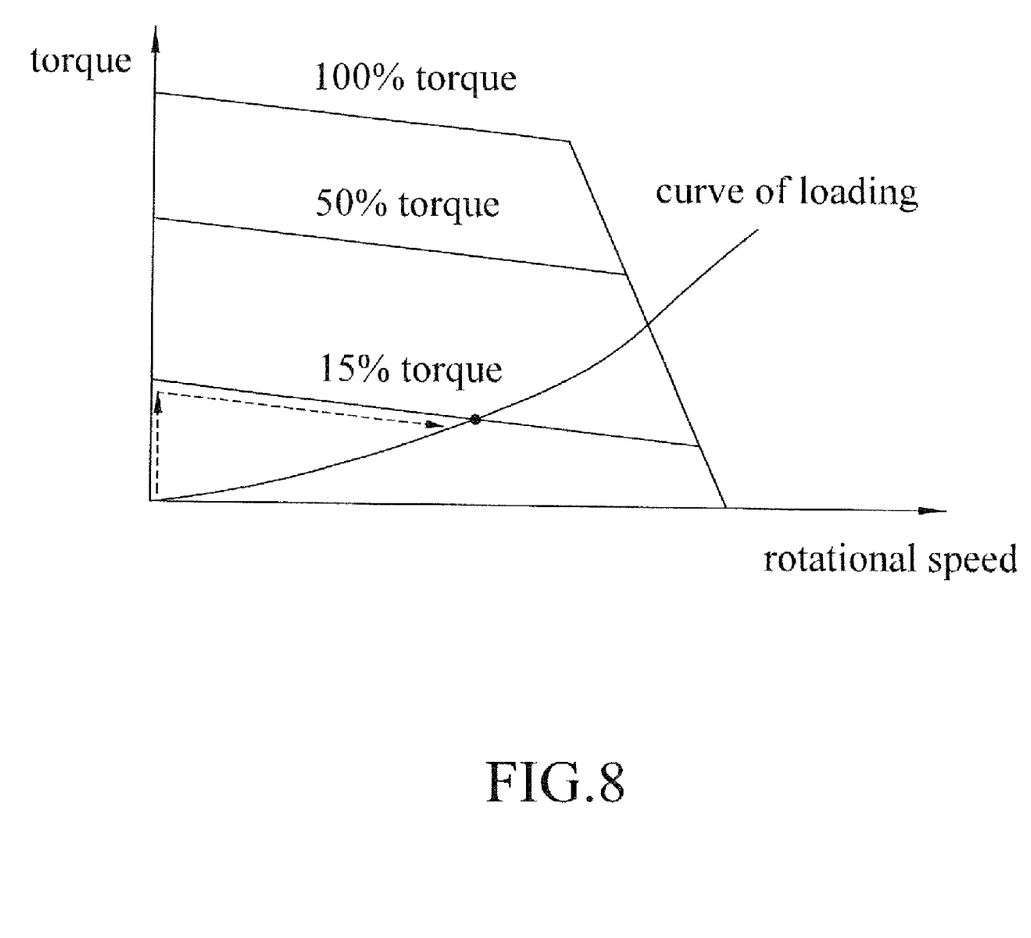
FIG. 8 is a plot of torque vs. rotational speed according to the present invention.

Also referring to FIG. 8, a plot of torque vs. rotational speed of the permanent magnet kinetic mechanism according to the present invention under a motor drive mode or a power generation mode is shown. For the motor drive mode, when accelerator is immediately raised from standstill to 15% level of torque, the behavior of torque is shown by the phantom lines. Starting torque realized with an output of 15% prevents undesired variation of torque and eliminates discomfort and unsmooth of riding being eliminated.

On the other hand, for the power generation mode, the torque curve for 15% level of torque is indicated by the phantom lines. Starting torque realized with a level of 15% torque helps eliminating instantaneous great torque that leads to engine braking and makes riding unsmooth.

The above described embodiments illustrate the method for controlling power generation according to the present invention applied to an electric motor having a power generation mode and used for realizing torque behavior of an electrical motorcycle. However, the present invention is not limited to such applications. For example, each switch group described above can be each electrically connected to a circuit system, which includes, but is not limited to, a power storage device or an application device for use with a load.

Further, the method for controlling power generation according to the present invention allows a kinetic mechanism 10 to effectively convert the kinetic energy of a rotor thereof into electrical energy even at a low rotational speed of the rotor. The rotation and rotational speed of the rotor is controlled by a force input device, which includes, but is not limited to, a rotary device rotated by wind power or hydraulic power.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A method for controlling power generation, comprising a drive circuit and a control circuit, the drive circuit receiving a control signal from the control circuit, the drive circuit comprising at least two groups of switch, which are connected in parallel to each other, each group comprising a first switch and a second switch, which are connected in series with each other, a kinetic mechanism that comprises rotor, stator, and magnetic field having phases each of which is connected between the first and second switches of each group, at least one rotor position detection element arranged to detect position signals of the rotor, the switch groups being each electrically connected to a circuit system, wherein the method for controlling power generation comprises the following steps:

each of the second switches being subjected to pulse width modulation for ON/OFF switching according to the position signals of the rotor, and each of the first switches remaining OFF.

2. The method according to claim 1, wherein the switch that is subjected to pulse width modulation for ON/OFF switching is switched ON/OFF at a time when a back EMF of a corresponding coil enters a high voltage zone, the high voltage zone being a high voltage zone of an upper half wave of voltage wave, the switching being set ON at an angular position of $[180°-(360°/\text{phase number})]/2$ of the upper half wave and OFF at an angular position of $180°-\{[180°-(360°/\text{phase number})]/2\}$.

3. The method according to claim 1, wherein the switch that is subjected to pulse width modulation for ON/OFF switching is switched ON/OFF at a time when a back EMF of a corresponding coil enters a high voltage zone, the high voltage zone being a high voltage zone of a lower half wave of voltage wave, the switching being set ON at an angular position of $\{[180°-(360°/\text{phase number})]/2\}+180°$ of the lower half wave and OFF at an angular position of $\{180°-\{[180°-(360°/\text{phase number})]/2\}\}+180°$.

4. The method according to claim 1, wherein a current detection element and a current signal shifting circuit are employed to detect and shift a negative current signal generated by the drive circuit so as to convert the negative current signal into a positive current signal.

5. The method according to claim 1, wherein the kinetic mechanism comprises rotor, stator, and magnetic field is an electric motor.

6. The method according to claim 5, wherein the electric motor controls an electric torque thereof through control of electrical current generated.

7. The method according to claim 1, wherein the kinetic mechanism that comprises rotor, stator, and magnetic field is an electric generator.

8. The method according to claim 7, wherein the rotor of the electric generator is driven by a force input device for rotation.

* * * * *